(12) United States Patent
Koob

(10) Patent No.: US 8,603,452 B1
(45) Date of Patent: Dec. 10, 2013

(54) METHOD OF PREVENTING BIOFOULING USING AN ANTI-FOULING BIO-HYDROGEL COMPOSITION

(75) Inventor: Thomas J. Koob, Tampa, FL (US)

(73) Assignee: University of South Florida, Tampa, FL (US)

( * ) Notice: Subject to any disclaimer, the term of this patent is extended or adjusted under 35 U.S.C. 154(b) by 1294 days.

(21) Appl. No.: 12/114,106

(22) Filed: May 2, 2008

Related U.S. Application Data

(60) Provisional application No. 60/915,464, filed on May 2, 2007.

(51) Int. Cl.
*A61K 31/74* (2006.01)

(52) U.S. Cl.
USPC ................... 424/78.09; 424/78.08

(58) Field of Classification Search
USPC ...................................... 424/78.09
See application file for complete search history.

(56) References Cited

U.S. PATENT DOCUMENTS

| | | | |
|---|---|---|---|
| 4,129,610 | A | 12/1978 | Kobayashi et al. |
| 4,234,340 | A * | 11/1980 | Pellico ........................ 106/15.05 |
| 4,253,877 | A * | 3/1981 | Miale et al. ................. 106/18.35 |
| 4,566,906 | A | 1/1986 | McGinniss et al. |
| 4,594,365 | A | 6/1986 | Russell et al. |
| 5,593,732 | A | 1/1997 | Griffith |
| 5,741,828 | A | 4/1998 | Stoy et al. |
| 6,110,990 | A | 8/2000 | Nakamura et al. |
| 6,692,557 | B1 | 2/2004 | De Nys et al. |
| 6,764,846 | B2 | 7/2004 | Yamamori et al. |
| 6,818,018 | B1 | 11/2004 | Sawhney |
| 6,821,530 | B2 | 11/2004 | Koob et al. |
| 2005/0069519 | A1 | 3/2005 | Osada et al. |
| 2007/0031498 | A1 | 2/2007 | Zong et al. |

OTHER PUBLICATIONS

Smith MJ, Flowers TH, Cowling MJ, Duncan HJ. "Release studies of benzalkonium chloride from hydrogel in a freshwater environment." J Environ Monit. 2003 Apr. vol. 5. No. 2 pp. 359-362.

Yoshinori Katsuyama, Takayuki Kurokawa, Tatsuo Kaneko, Jian Ping Gong, Yoshihito Osada, Norishige Yotsukura, Taizo Motomura. "Inhibitory Effects of Hydrogels on the Adhesion, Germination, and Development of Zoospores Originating from Laminaria angustata." Macromolecular Bioscience. Apr. 2002. vol. 2. Issue 4. pp. 163-169.

A. C. S. Parr, M. J. Smith, C. M. Beveridge, A. Kerr, M. J. Cowling, T. Hodgkiess. "Optical assessment of a fouling-resistant surface (PHEMA/ benzalkonium chloride) after exposure to a marine environment." Advanced Materials for Optics and Electronics. Dec. 1998. vol. 8. Issue 4. pp. 187-193.

His E.; Beiras R.; Quiniou F.; Parr A.C.S.; Smith M.J.; Cowling M.J.; Hodgkiess T. "The non-toxic effects of a novel antifouling material on oyster culture." Water Research. vol. 30. No. 11. Nov. 1996. pp. 2822-2825.

Gatenholm, P.; Holmstroem, C.; Maki, JS.; Kjelleberg, S. "Towards biological antifouling surface coatings: Marine bacteria immobilized in hydrogel inhibit *Barnacle larvae*." Biofouling. 1995. vol. 8. No. 4. pp. 293-301.

* cited by examiner

*Primary Examiner* — James Rogers
(74) *Attorney, Agent, or Firm* — Michele L. Lawson; Courtney M. Dunn; Smith & Hopen, P.A.

(57) ABSTRACT

The invention comprises a biological hydrogel that is chemically stabilized with non-covalent or covalent cross-links. The biological hydrogel is used to coat surfaces of materials for submersion in marine water. Molecular dissolution at the marine water-hydrogel surface prevents attachment of fouling organisms. The rate of dissolution can be controlled by both the concentration of the biopolymer in the hydrogel and the nature and concentration of cross-linker used. Additional components, either molecular or particulate, can be added to the biological hydrogel before or after cross-linking for enhanced properties.

7 Claims, 6 Drawing Sheets

FA  NDGA  TA  chrome  sumac

CaS      NDGA      3HT      34BA

METHOD OF PREVENTING BIOFOULING USING AN ANTI-FOULING BIO-HYDROGEL COMPOSITION

CROSS REFERENCE TO RELATED APPLICATIONS

This application claims priority to currently pending U.S. Provisional Patent Application 60/915,464, filed May 27, 2007, the contents of which are herein incorporated by reference.

STATEMENT OF GOVERNMENT INTEREST

This invention was made with government support under Grant No. DASG60-00-C0089 awarded by the U.S. Army Space Missile Command. The government has certain rights in the invention.

BACKGROUND OF THE INVENTION

Biofouling, or biological fouling, is the undesirable accumulation of microorganisms, plants, algae, and animals on submerged structures, such as ships' hulls and immersed sensors. Fouling causes huge material and economic costs in maintenance of mariculture, shipping industries, naval vessels, scientific research, and marine water pipelines. Governments and industry expend substantial resources to prevent and control marine biofouling. Coatings for submerged surfaces are formulated with toxic copper compounds or other special chemistry, which impede growth of barnacles, algae, and other such organisms.

U.S. Patent Application Publication No. 2005/0069519 to Osada, et al. describes an anti-adhesion agent for marine organisms comprising a hydrogel. The hydrogel discourages adhesion through a proton concentration of $10^{-4}$ mol/L to 5 mol/L derived from an acidic group of a network macromolecule comprising the hydrogel and/or from an acidic substance existing in the gaps in the network macromolecule.

Other work (see Smith, M. J., et al., "Release Studies of Benzalkonium Chloride from Hydrogel in a Freshwater Environment." *J. Environ. Monit.* 2003, Vol. 5: 359), describes the use of hydrogel coatings containing the cationic surfactant benzalkonium chloride (BAC) to prevent the development of biofouling for up to 12 weeks in the marine environment. BAC acts as a biocidal agent to prevent growth of organisms on the surface that is exposed to the water. A rapid initial loss of BAC from the hydrogel film was observed. The loss was found to be a combination of diffusive and mass flow, but the period from 12 to 50 hours appeared to fit to diffusion kinetics and a diffusion coefficient of $7.3 \times 10^{-8}$ cm$^2$ s$^{-1}$ (13° C.) was calculated, an order of 10 times greater than that found in marine water. Subsequently the rate of loss of the residual BAC, for which a diffusion coefficient of $5.7 \times 10^{-10}$ cm$^2$ s$^{-1}$ (15° C.) was measured, was too low to prevent the early stages of biofouling.

Katsuyama, et al. (Katsuyama, Y. et al., "Inhibitory Effects of Hydrogels on the Adhesion, Germination, and Development of Zoospores Originating from Laminaria Angustata." *Macromolecular Bioscience* 2002, Vol. 2(4): 163) evaluated the various properties of hydrogels in relation to anti-biofouling properties. Specifically, the inhibition of germination and development of zoospores from *Laminaria Angustata* on various kinds of hydrogels was studied. The effects of the water content of the hydrogel, the electrical nature, the charge density, and the counter-ions of hydrogels on the inhibition of zoospore germination and the development of gametophytes were investigated. The focus of the study was on modulation of the surface charge and roughness of the hydrogels.

SUMMARY OF INVENTION

The invention includes a biological hydrogel chemically stabilized with non-covalent or covalent cross-links. The biological hydrogel is used to coat surfaces of materials for submersion in marine water. Molecular dissolution at the marine water-hydrogel surface prevents attachment of fouling organisms. The rate of dissolution can be controlled by both the concentration of a biopolymer in the hydrogel and the nature and concentration of cross-linker used. Additional components, either molecular or particulate, can be added to the biological hydrogel before or after cross-linking for enhanced properties.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
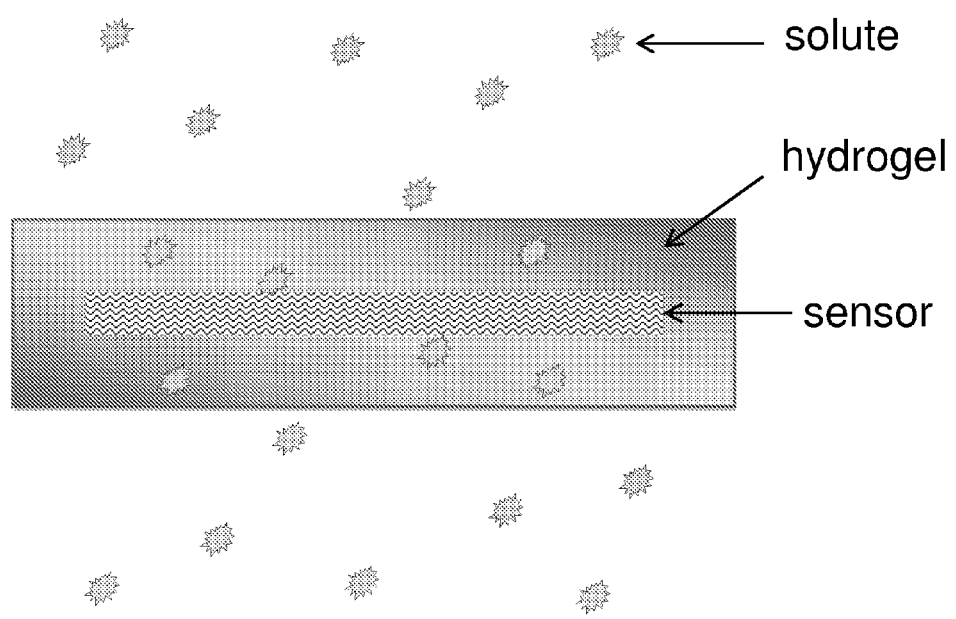
FIG. 1 is a conceptual illustration showing a biological hydrogel surrounding a sensor that detects solutes via diffusion of the solute through the biological hydrogel.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention includes a biological hydrogel applied to or around the surface of a material to prevent biofouling in the marine environment. The hydrogel can include any biological material, polymer, or combination thereof that forms a gel.

As used herein, a "hydrogel" refers to a material of solid or semi-solid texture that comprises water. Hydrogels are formed by a three-dimensional network of molecular structures within which water, among other substances, may be held. The three-dimensional molecular network may be held together by covalent chemical bonds, or by ionic bonds, or by any combination thereof. A common example of a hydrogel is gelatin, a protein that forms a gel from a sol upon heating and subsequent cooling. Not all substances that form hydrogels are proteins; polysaccharides, such as starches, may also form hydrogels. In one embodiment, the hydrogel is a biological polymer, such as type-A gelatin from porcine skin, forming a biological hydrogel.

In preparation, the hydrogel (10%, 20%, 30%, or 40% (w/v) biological polymer) is dissolved in water with heat to form a viscous liquid. The substantially liquid hydrogel can be applied to surfaces by any means, including but not restricted to, dipping, painting, or casting. Gelling occurs by cooling the substantially liquid hydrogel to about 4° C.

Hydrogels are generally formed through the mixture of two or more materials that undergo chemical reactions with each other to create the three-dimensional molecular network that provides the hydrogel with a degree of dimensional stability. Such mixtures of materials that interact or react with each other to form a hydrogel are referred to as a premix. Thus, a premix refers to a mixture of materials that, after mixing, will form the hydrogel. A premix may be of a liquid or semi-liquid texture such that it can be applied to a surface.

A hydrogel for use as an anti-fouling agent includes a hydrogel that achieves a gelled state after formation of a premix from more than a single component. In one embodiment of the invention, the premix comprises a biological hydrogel and a cross-linking agent, which, when combined, form a molecularly self-shedding biological hydrogel. The cross-linking agent is any chemical, compound, or catalyst that introduces new bonds in the gelled hydrogel polymer or forms a polymer itself that intercalates with the hydrogel through covalent or non-covalent bonds. Examples of cross-linking agents include, but are not limited to, formaldehyde, nordihydroguaiaretic acid, tannic acid, chrome sulfate, and sumac extract.

The hydrogel, which may be used to prevent anti-fouling of a surface in a marine environment, is formed upon gelation of the premix, which is in the physical form of a sol. Mixing of the components that make up the premix provides a liquid or semi-liquid sol that may be pumped or transferred by any technique suitable for handling viscous liquid materials. Upon standing, the premix sol forms the hydrogel of the present invention after a period of time.

The biological hydrogel is used to coat surfaces of materials for submersion in marine water. Molecular dissolution at the marine water-hydrogel surface prevents attachment of fouling organisms. The rate of dissolution can be controlled by both the concentration of biopolymer and cross-linker in the hydrogel, as well as the nature of cross-linker used. The rate of dissolution can also be controlled by the thickness of the coating.

Figure 2:
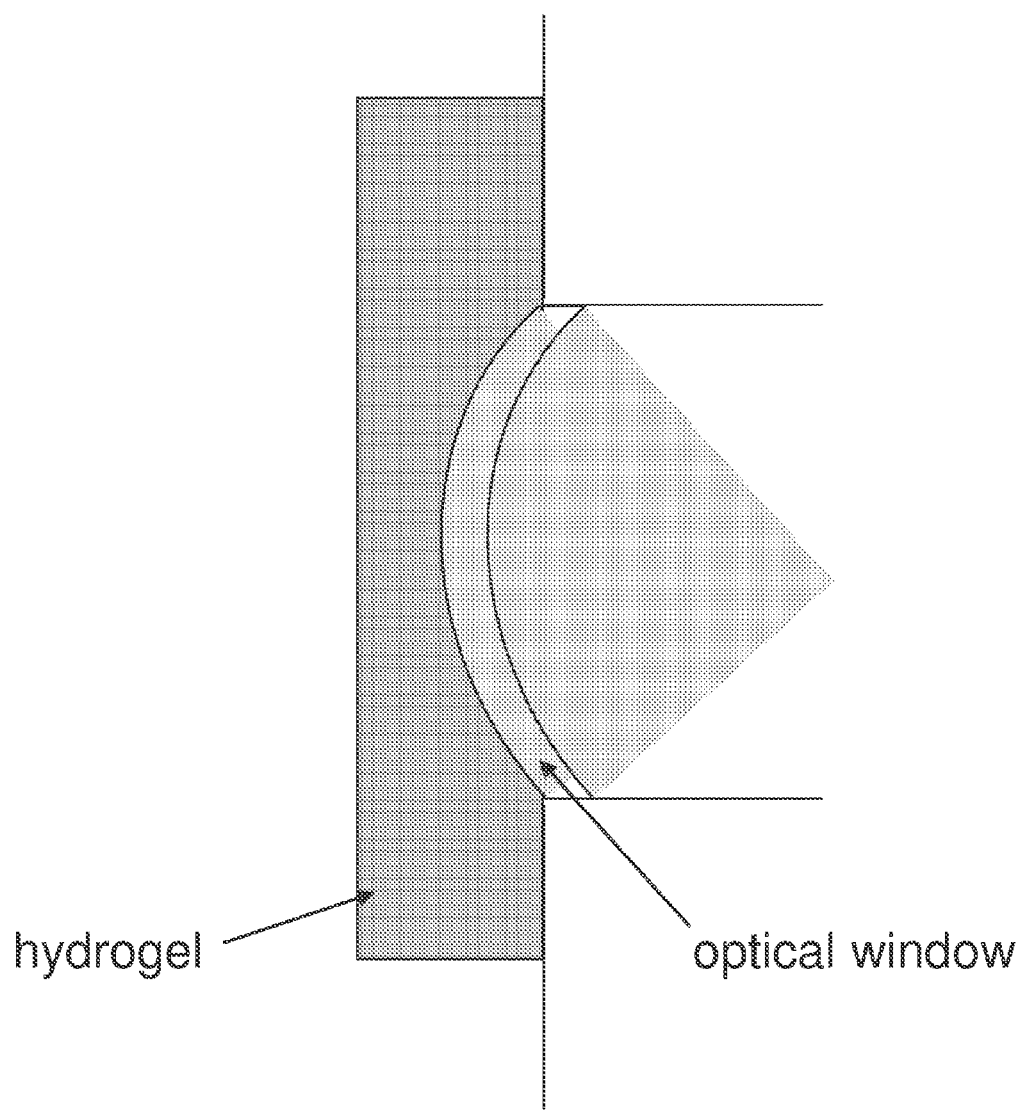
FIG. 2 is a conceptual illustration showing an optically clear biological hydrogel coating an optical window.

The molecularly self-shedding biological hydrogel can be used to coat any man-made or natural surface. An example of such a surface is the surface of a MEMS sensor. In the example shown in FIG. 1, the biological hydrogel forms a semi-permeable gel surrounding a MEMS sensor surface. The sensor detects a dissolved analyte or solute that reaches the sensor element by diffusion through the biological hydrogel. Selectivity can be enhanced by adjusting the molecular size permeability of the biological hydrogel. Another example of a surface for the marine environment that can be coated with a self-shedding biological hydrogel is the surface of an optical window as shown in FIG. 2. In this embodiment, the gel is optically clear, as in the case of gelatin gels.

The hydrogel that forms from the sol is suitable for contact with the marine environment, being non-toxic, biocompatible, and biodegradable. Thus, the hydrogel can remain in contact with a marine animal for an extended period of time without damaging the animal. In one embodiment, the hydrogel has adhesive properties towards the surface upon which it is disposed but does not display adhesive properties towards a marine animal, which may encounter the hydrogel. This embodiment avoids contaminating the animal, leaving it free to adhere to another surface.

In another embodiment, the hydrogel is combined with at least one enhancing agent. An enhancing agent is any compound added to the hydrogel, or premix that enhances the hydrogel by providing further stability or functional advantages. Enhancing agents can be added before or after cross-linking.

Example I

Figure 3:
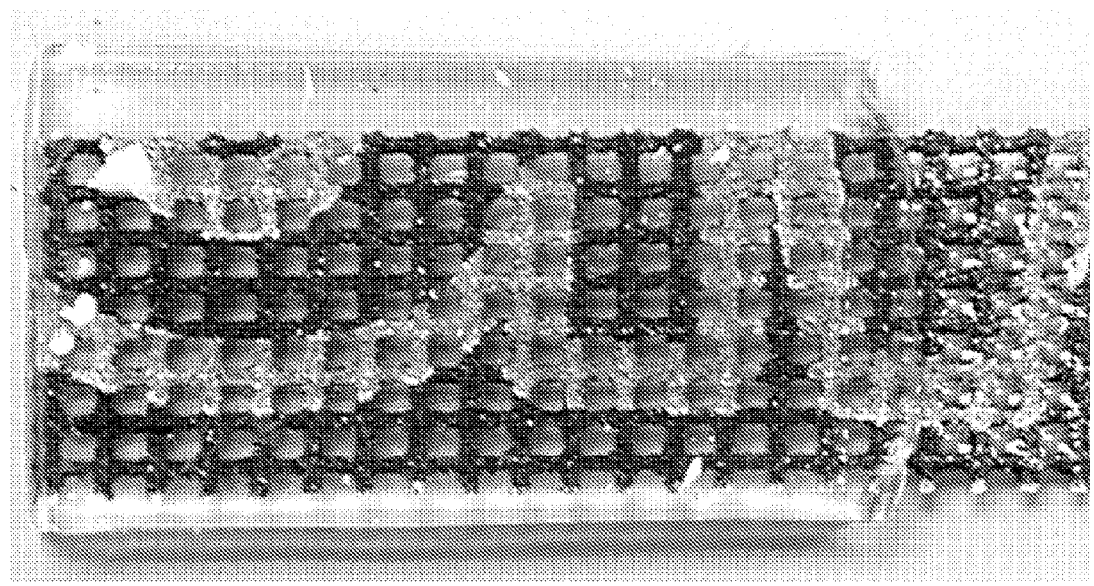
FIG. 3 shows 10% gelatin gels formed around dry wall sanding screen.
Figure 4:
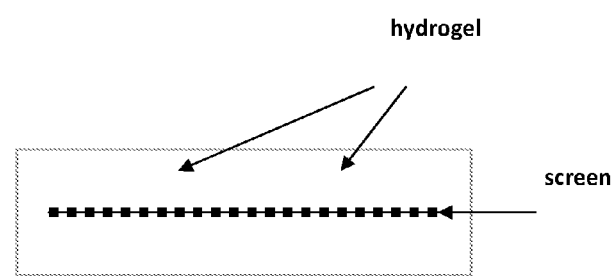
FIG. 4 is a conceptual diagram of the gel entirely surrounding the screen.

Hydrogels were formed using type-A gelatin from porcine skin as the biological polymer. The hydrogel was dissolved in water with heat to form a viscous liquid. Formulations were made with 10%, 20%, 30%, and 40% (w/v) biological polymer. The viscous solution was then placed on a planar support, a dry wall sanding screen (FIG. 3 (10% (w/v))) and cooled to 4° C. FIG. 4 shows a conceptual diagram of the hydrogel surrounding the screen.

Figure 5:
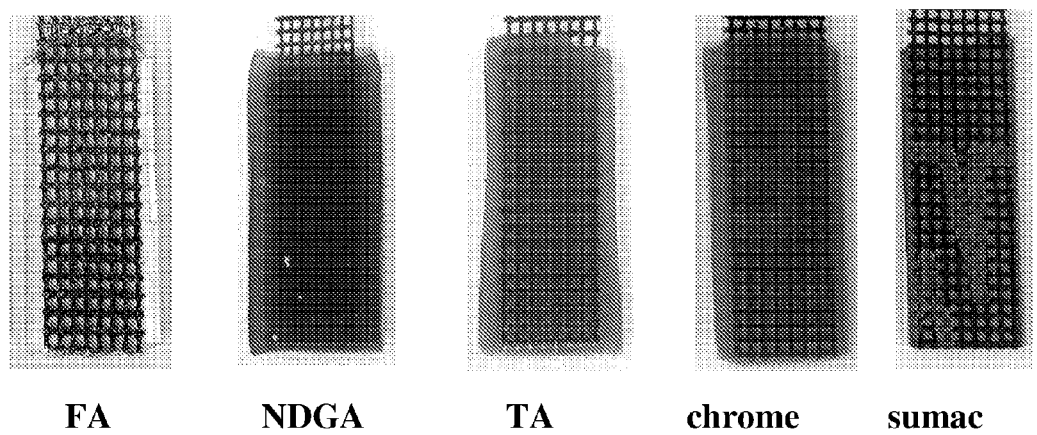
FIG. 5 shows 10% gelatin gels cross-linked with formaldehyde (FA), nordihydroguaiaretic acid (NDGA), tannic acid (TA), chrome sulfate, or sumac extract.
Figure 6:
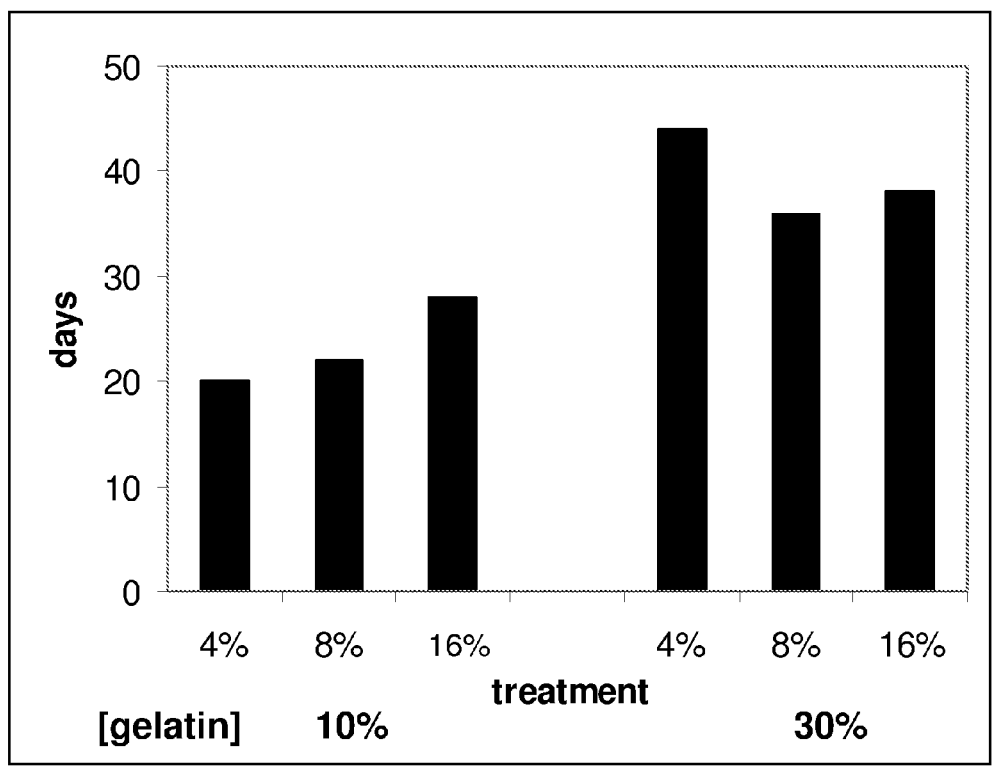
FIG. 6 is a chart showing the number of days for complete dissolution of gelatin hydrogels in the marine environment. Gelatin concentration was either 10 or 30%. Formaldehyde concentration was 4, 8, or 16%.

The biological hydrogel was then chemically stabilized with formaldehyde, nordihydroguaiaretic acid, tannic acid, chrome sulfate, and sumac extract as the polymerizing (cross-linking) agents (FIG. 5). Concentrations of the cross-linking agent were 4%, 8%, and 16%, as shown in FIG. 6. In the example given in FIG. 6, the gelatin concentration was 10% and 30% (w/v); the formaldehyde concentration was 4%, 8%, and 16% (v/v). The number of days it took for the biological hydrogels to dissolve completely in aqueous environment is shown in FIG. 6.

Example II

Figure 7:
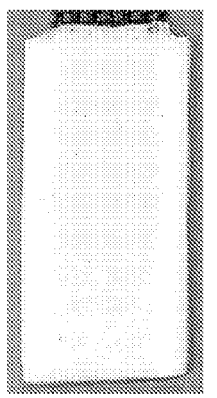
FIG. 7 shows 10% gelatin hydrogels containing calcium sulfate (CaS) or post-treated with NDGA, 3-hydroxytyramine (3HT), or 3,4-dihydroxybenzaldehyde (34BA).
Figure 7:
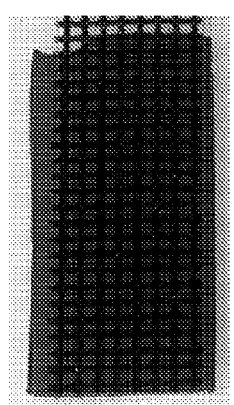
Figure 7:
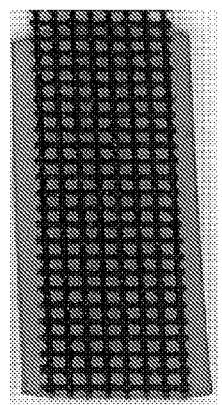
Figure 7:
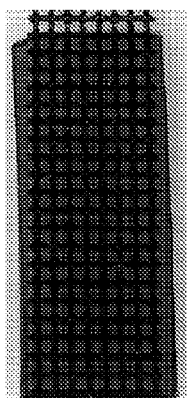

Insoluble particulate 340-mesh calcium sulfate (CaS) crystals were mixed with 10% gelatin before gel formation and cross-linking with formaldehyde. In another embodiment, also shown in FIG. 7, 10% formaldehyde treated 10% gelatin gels were subsequently treated with nordihydroguaiaretic acid (NDGA), 3-hydroxytyramine (3HT), and 3,4-dihydroxybenzaldehyde (34BA).

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of preventing the biofouling of a material exposed to a marine environment comprising: dissolving a hydrogel comprising gelatin in water to form a viscous fluid wherein gelatin comprises between about 10% and 40% (w/v) of the hydrogel; applying the viscous fluid to a substrate; applying a cross-linking agent selected from the group consisting of formaldehyde, nordihydroguaiaretic acid, tannic acid, chrome sulfate, and sumac extract to the viscous fluid on the substrate to form an anti-adhesion agent wherein the cross-linking agent is between about 4% and 16% (w/v) of the hydrogel; cooling the substrate coated with the anti-adhesion agent to about 4° C.; and introducing the substrate to the marine environment.

2. The method of claim 1, further comprising adding an enhancing agent to the hydrogel.

3. The method of claim 2, wherein the enhancing agent is added to the hydrogel before the cross-linking agent.

4. The method of claim 2, wherein the enhancing agent is added to the hydrogel after the cross-linking agent.

5. The method of claim 1, wherein the hydrogel is applied to the substrate by a method selected from the group consisting of dipping, painting, and casting.

6. The method of claim 3, wherein the enhancing agent is selected from the group consisting of molecular components and particulate components.

7. The method of claim 3, wherein the enhancing agent is selected from the group consisting of calcium sulfate (CaS) crystals, nordihydroguaiaretic acid (NDGA), 3-hydroxy-tyramine (3HT), and 3,4-dihydroxybenzylaldehyde (3,4BA).

* * * * *